US007752992B2

(12) United States Patent
Takeshige et al.

(10) Patent No.: US 7,752,992 B2
(45) Date of Patent: Jul. 13, 2010

(54) INSTRUMENTAL DEVICE FOR VEHICLE

(75) Inventors: Tetsuo Takeshige, Saitama (JP); Koji Okamoto, Saitama (JP); Mamoru Otsubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 11/978,707

(22) Filed: Oct. 30, 2007

(65) Prior Publication Data

US 2008/0141927 A1 Jun. 19, 2008

(30) Foreign Application Priority Data

Dec. 19, 2006 (JP) ............................. 2006-341302

(51) Int. Cl.
*G01D 11/28* (2006.01)
*G01D 13/02* (2006.01)
(52) U.S. Cl. ...................... 116/62.4; 116/286; 116/334; 116/DIG. 36; 362/29
(58) Field of Classification Search .............. 116/28 R, 116/62.1–62.4, 284, 286, 287, 300, 302, 116/305, 334, 335, DIG. 36, DIG. 47; 362/23, 362/26–30, 489; 340/461
See application file for complete search history.

(56) References Cited

U.S. PATENT DOCUMENTS

| 2,189,536 A | * | 2/1940 | Stuerzl ....................... 116/62.4 |
| 2,702,520 A | * | 2/1955 | Helgeby ....................... 116/300 |
| 3,276,418 A | * | 10/1966 | Harris ......................... 116/334 |
| D252,320 S | * | 7/1979 | Chojna ....................... D10/103 |
| 4,875,433 A | * | 10/1989 | Tsukamoto .................. 116/335 |
| 6,573,877 B2 | * | 6/2003 | Wedel et al. .................... 345/4 |
| 6,856,478 B1 | * | 2/2005 | Miyanishi et al. ........... 359/885 |
| 6,938,551 B2 | * | 9/2005 | Inoue et al. .................. 101/491 |
| 6,951,399 B2 | * | 10/2005 | Tamura ....................... 362/23 |
| 6,962,127 B2 | * | 11/2005 | Birke et al. .................. 116/305 |
| 7,113,080 B2 | * | 9/2006 | Suzuki ....................... 340/438 |
| 7,275,497 B2 | * | 10/2007 | Kato .......................... 116/304 |
| 2004/0153782 A1 | * | 8/2004 | Fukui et al. .................... 714/25 |

FOREIGN PATENT DOCUMENTS

| DE | 3028827 A1 | 2/1982 |
| DE | 102 49 765 A1 | 5/2004 |
| FR | 2 888 320 A1 | 1/2007 |
| JP | 2962162 B2 | 8/1999 |
| JP | 2002-98557 A | 4/2002 |

\* cited by examiner

*Primary Examiner*—Amy Cohen Johnson
(74) *Attorney, Agent, or Firm*—Birch, Stewart, Kolasch & Birch, LLP

(57) ABSTRACT

An instrumental device for a vehicle including two kinds of speed displays with improved discrimination between the two displays. An instrumental device includes: a transparent board; a first speed display, a second speed display and a gear range display, which are printed on the board. A backlight is provided for emitting light onto the board. In the instrumental device, the second speed display is disposed between the first speed display and the gear range display in the radial direction of a dial. In addition, the first speed display and the gear range display are printed on the front side of the board while the second speed display is printed on the back side of the board.

22 Claims, 3 Drawing Sheets

INSTRUMENTAL DEVICE FOR VEHICLE

CROSS-REFERENCE TO RELATED APPLICATIONS

The present application claims priority under 35 USC 119 to Japanese Patent Application No. 2006-341302 filed on Dec. 19, 2006 the entire contents thereof is hereby incorporated by reference.

BACKGROUND OF THE INVENTION

1. Field of the Invention

The present invention relates to an instrumental device employed in a vehicle, such as a motorcycle.

2. Description of Background Art

Japanese Patent No. 2962162 discloses a display configuration related to an instrumental device for a vehicle. More specifically, to a configuration to display a first printed part for indicating the speed of the vehicle with a scale, numerals and the like on the front side of a transparent board, and to display a second printed part for showing various warnings and the like on the back side of the board.

For the speed display part of the above-mentioned instrumental device, there is a hybrid form, in which both km/h display (kilometers-per-hour display) and mph display (miles-per-hour display) are shown. It is desired to make it easier to discriminate between display in km/h and display in mph in such a configuration.

SUMMARY AND OBJECTS OF THE INVENTION

Accordingly, an object of the present invention is to make it easier, in an instrumental device for a vehicle including two kinds of speed displays, to discriminate between the two speed displays.

As means to solve the above-mentioned problem, an embodiment of the present invention provides an instrument panel 1 including a board 21a, a first and second printed speed display parts 26a and 27a, a third printed gear-range display part 28a and a backlight 18. The board is made of a transparent material. The first and second printed parts are provided on the board, and display two kinds of information on vehicle speed. The third printed part is provided on the board, and displays information other than that on vehicle speed. In the instrumental device, the second printed part is disposed between the first and third printed parts. The first and third printed parts are printed on the front side of the board while the second part is printed on the back side of the board. The backlight emits light onto the board.

An embodiment of the invention provides the third printed part that displays information on gear shift.

An embodiment of the invention provides the first, second and third printed parts that are disposed in a concentric fashion as well as on respective, approximately circular arcs. In addition, the first, second and third printed parts are arranged in this order from the outer side to the inner side in the radial direction of the circular arcs.

According to an embodiment of the invention, it is possible to ensure a high level of visibility for the information needed during normal driving with the following configuration. More specifically, in the instrumental device, the primary information on the vehicle speed is set to be displayed on the first printed part printed on the front side of the board together with the third printed part. Meanwhile, the secondary information on the vehicle speed is set to be displayed on the second printed part printed on the back side of the board. This makes it possible to create a sense of depth, that is, to create a sense of perspective between the first and second printed parts in the thickness direction of the board (in other words, to provide a depth effect to the second printed part), especially when the backlight is emitted. Thus, it is easier to discriminate between the speed displays.

According to an embodiment of the invention, the display of the second printed part, which is sandwiched between the first and third printed parts, can be provided on the far side of the board. In addition, the radius of the second printed part is set smaller than that of the first printed part. With this configuration, it is possible to make the second printed part appear to be positioned farther than it really is.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, a description will be given of an embodiment of the present invention with reference to drawings.

Figure 1:
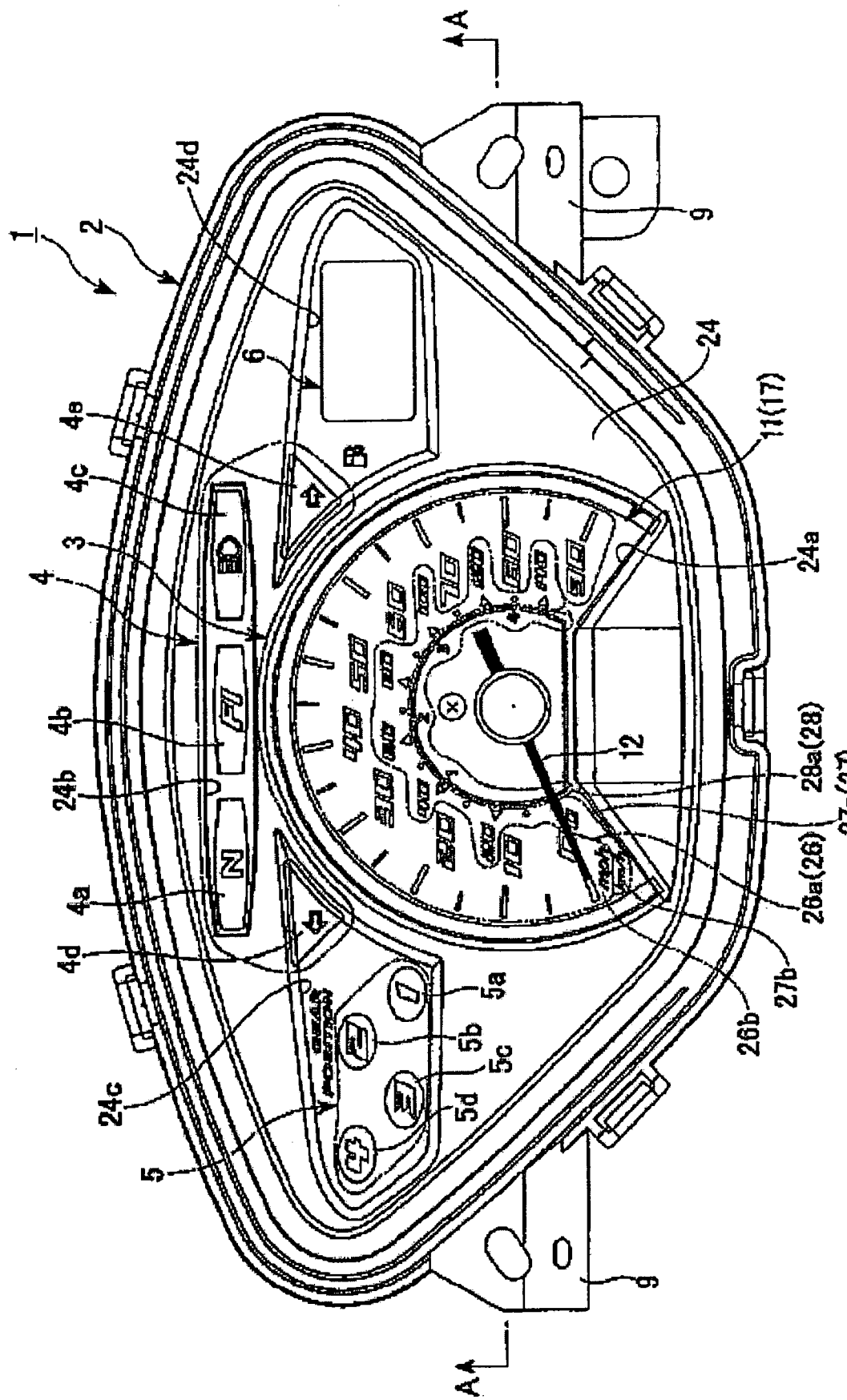
FIG. 1 is a front view showing an instrument panel according to an embodiment of the present invention.

FIG. 1 is a front view of an instrument panel 1 with which a vehicle, for example, a motorcycle is equipped. The instrument panel 1 displays various kinds of vehicle information for the driver. FIG. 1 corresponds to a view on arrow from the driver's view. Hereinafter, directions, such as above, below, right and left, used in the description correspond to those in FIG. 1.

The instrument panel 1 is, when viewed from the front, in an inverse trapezoidal shape with the lower side being narrow and the upper side being curved so as to form an upward convex shape. The instrument panel 1 includes a housing 2 forming the trapezoidal shape and a speedometer 3 disposed in an approximately center part of the housing 2. The instrumental panel 1 also includes a group of various indicator lamps 4 (hereinafter, referred to simply as an "indicator lamp group"). The indicator lamps 4 are disposed above the speedometer 3 and distributed to both the right and the left sides above the speedometer, respectively. In addition, the instrumental panel 1 includes a gear-position lamp group 5 disposed to the left of the speedometer 3 and an information display part 6 disposed to the right of the speedometer 3.

Figure 2:
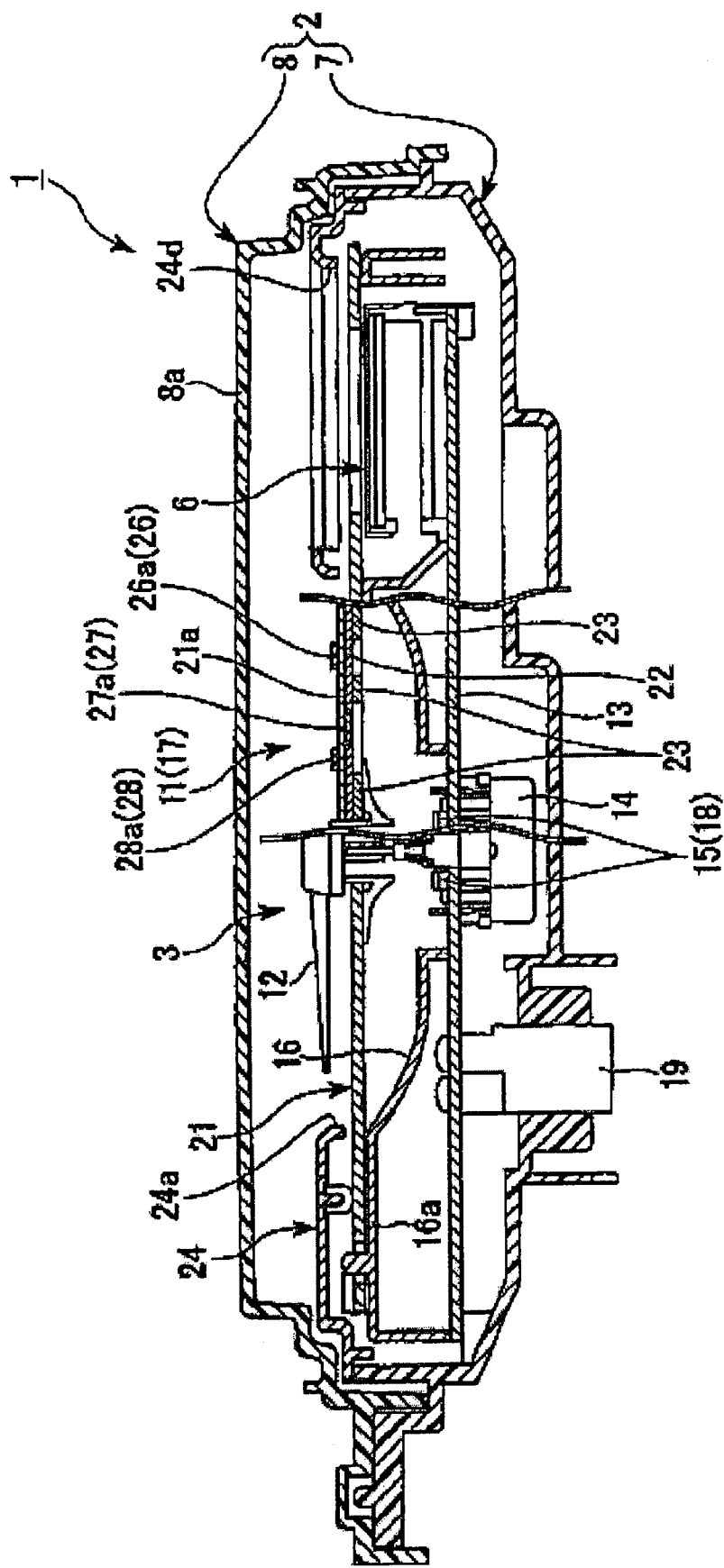
FIG. 2 is a cross-sectional view of the instrument panel taken along the line A-A of FIG. 1.

Referring to FIGS. 1 and 2, the housing 2 is formed of two separated parts. When viewed the front of the instrumental panel 1, the part of the housing 2 positioned farther from the viewer is a base part 7 and the other part positioned closer to the viewer is a cover part 8. The base part 7 and the cover part 8 are each made of a resin and are integrated with each other to form a sealed interior space. The base part 7 is made of non-transmissive resin in a black color or the like, and the cover part 8 is made of a clear, transparent, and transmissive resin. The cover part 8 forms an outer lens 8a in a slightly small, trapezoidal shape that follows the outline of the housing when viewed from the front of the instrumental panel 1. The outer lens 8a is in a flat-plate shape, and is provided approximately in parallel with the sheet on which FIG. 1 is shown (i.e. approximately orthogonal to the direction of the driver's view). The inside of the housing 2 is visible through the outer lens 8a. In addition, mount extensions 9 are provided in a projecting manner on both the right and left side of the housing 2.

The speedometer 3 disposed in the housing 2 is for displaying the driving speed of the vehicle (the vehicle speed) on which the instrument panel 1 is mounted. The speedometer 3 also includes a dial 11, a pointer 12, a circuit board 13, a stepping motor 14, multiple LEDs 15 and a reflecting plate (reflector) 16. The dial 11 that has a flat-plate shape is provided on the base part 7 side, and is parallel to the outer lens 8a having space in between. The pointer 12 moves rotationally about the center of the dial 11 to point at the speed scale of the dial 11 and the like. The pointer 12 and the dial 11 comprise an analog display part 17. The circuit board 13 in a flat-plate shape is provided on the base part 7 side and in parallel to the dial 11 having a space in between. The stepping motor 14 for moving the pointer 12 is provided to the back side of the circuit board 13 (on the base part 7 side). In the vicinity of the stepping motor 14, the LEDs 15 are provided to the front side (on the cover port 8 side) of the circuit board 13. The reflecting plate 16 is formed in a shallow bowl shape that has, as the bottom, the vicinity of the places where the LEDs 15 are provided (i.e. the vicinity of the axis about which the pointer 12 moves), and that has the opening on the dial 11 side. The LEDs 15 and the reflecting plate 16 comprise a backlight 18 that irradiates the dial 11 from the back side thereof (i.e. from the inside of the housing 2). The backlight 18 emits orange-colored light.

The dial 11 is in an approximately round shape with the lower side cut to be flat when viewed from the front. The dial 11 has an appropriate speed display and the like printed on the front and back sides of a board 21a that is a part (the center part) of a base plate 21 disposed between, and in parallel to, the outer lens 8a and the circuit board 13.

Figure 3:
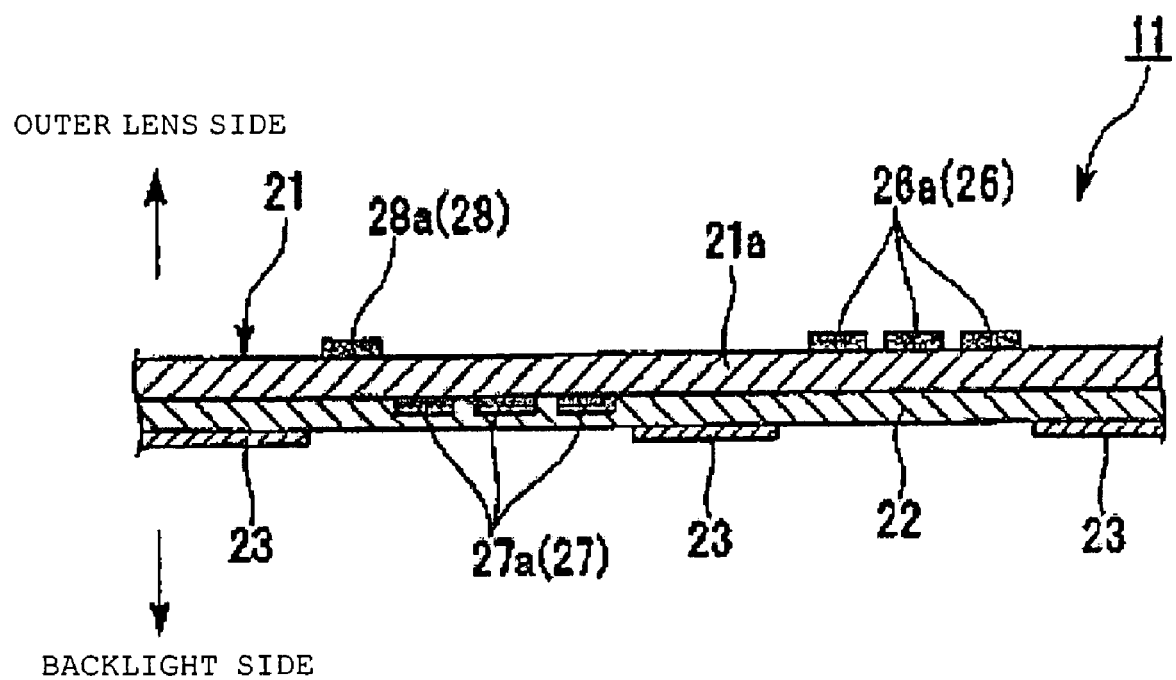
FIG. 3 is an enlarged view of an essential part of FIG. 2.

Referring to FIGS. 1, 2 and 3, the base plate 21 (the board 21a) is made of clear, transparent, and transmissive glass epoxy. On the entire back side of the base plate 21, a base semi-transmissive layer 22 in, for example, silver color is printed. On top of the semi-transmissive layer 22, a base non-transmissive layer 23 is printed in, for example, black color at necessary positions, and thus defines a transmissive region for the light emitted by the backlight 18.

The outer circumference of the base plate 21 and the like are supported by an extension part 16a, which is provided to the outer circumference of the opening end of the reflecting plate 16, from the base part 7 side. The outer circumference of the extension part 16a and the bottom of the reflecting plate 16 and the like are supported by the circuit board 13 from the base part 7 side. The outer circumference and the like of the circuit board 13 are supported by the base part 7. FIG. 2 also shows a coupler for a main harness (a coupler 19). The coupler 19 is provided to the back side of the circuit board 13 so as to project outside the housing 2.

On the front side of the base plate 21, provided is a cover-side extension part 24. The cover-side extension part 24 covers, from the cover part 8 side, the region other than the dial forming part (the part of the above-mentioned board 21a) and the parts to which the respective lamp groups 4 and 5 and the information display part 6 are disposed. More specifically, the cover-side extension part 24 includes the following cut-out portions individually: a center cut-out portion 24a in a round shape that follows the outline of the dial 11; an upper cut-out portion 24b that is horizontally long and is positioned in the region above the dial 11; and a left and right cut-out portions 24c and 24d that are respectively positioned at the upper left and the upper right sides of the dial 11.

In the center cut-out portion 24a, the analog display part 17 of the speedometer 3 is disposed. A neutral lamp 4a, a fuel injection (FI) lamp 4b and a high-beam lamp 4c are disposed in this order from the left in the upper cut-out portion 24b. A first gear to fourth gear lamps 5a to 5d of the gear-position lamp group 5 and a left direction indicator lamp 4d of the indicator lamp group 4 are disposed in this order from the left in the left cut-out portion 24c. A right direction indicator lamp 4e of the indicator lamp group 4 and the information display part 6 are disposed in this order from the left in the right cut-out portion 24d.

The neutral lamp 4a is lit while the gear is in neutral position, the FI lamp 4b is lit when the fuel injector is in an abnormal state, the high-beam lamp 4c is lit while the headlamp provides the high beam, and the left and right direction indicator lamps 4d and 4e blink while the left and right direction indicators are on. Among the first gear to fourth gear lamps 5a to 5d, a lamp that corresponds to the current gear position of the gear (first gear to fourth gear) is lit. The information display part 6 digitally displays the amount of fuel remaining, travel distances (trip travel distance and total travel distance), time and the like. To this end, the information display part 6 is mounted on the front left side of the circuit board 13 while having a digital display unit, such as a liquid crystal display (LCD), as the main part.

To the outer circumference side of the dial 11, a first speed display part 26 marked with a first speed display 26a in mph (miles per hour) is provided around the axis of rotational movement of the pointer 12. The first speed display 26a includes numerical representation of speed in mph and a scale respectively disposed on the inner circumference side and on the outer circumference side of the first speed display part 26.

Concurrently, at the inner circumference side of the first speed display part 26, a second speed display part 27 marked with a second speed display 27a in km/h (kilometers per hour) is provided around the same axis as that around which the first speed display part 26 is provided. The second speed display 27a includes a numerical representation of speed in km/h and a scale respectively disposed at the outer circumference side and at the inner circumference side of the second speed display part 27.

The speed displays 26a and 27a are marked with numerals (vehicle speed) so that the numerals increase in the speed displays 26a and 27a in a clockwise direction respectively from 0 mph and 0 km/h marked on the bottom-left portion of the dial 11. The scale and the numerals of the second speed display 27a are small compared to those of the first speed display 26a. This indicates that, in this embodiment, the first speed display 26a, which employs the representation of speed in miles per hour, is assumed to be primary, and the second speed display 27a, which employs the representation of speed in kilometers per hour, is assumed to be secondary. Some of the numerals of the second speed display 27a (those positioned on the two sides of dial 11) overlap the numerals of the first speed display 26a (also positioned on the two sides of the dial 11) in a circumferential direction, while each of these numerals is at approximately the same position in the respective radial directions.

At the inner circumference side of the second speed display part 27, and in the portion farther inside from the second speed display part 27, a gear-range display part 28 marked with a gear range display (display of a suitable gear range to use in relation to vehicle speed) is provided around the same axis as that of the second speed display part 27. The gear range display 28*a* is marked with numerals (the number of gears) so that the numerals increase in a clockwise direction similar to the speed displays 26*a* and 27*a*. The scale and the numerals of the gear range display 28*a* are even smaller than those of the second speed display 27*a*. The displays 26*a*, 27*a* and 28*a* are provided in a concentric fashion as well as on respective, approximately circular arcs.

The first speed display 26*a* is formed of a non-transmissive layer in, for example, a black color, and is printed on the front side of the board 21*a* (i.e. the side facing the driver). The second speed display 27*a* is, on the other hand, formed of a semi-transmissive layer in, for example, a blue color, and is printed on the back side of the board 21*a* (i.e. the opposite side of the board 21*a* from the driver). The second speed display 27*a* is printed before the printing of the base semi-transmissive layer 22.

The gear range display 28*a* is formed of a non-transmissive layer in a black color, and is printed on the front side of the board 21*a* concurrently with printing the first speed display 26*a*.

In addition, on the bottom left portion of the dial 11, provided are a first measurement unit display (mph) 26*b* adjacent to the left-end of the circular first speed display 26*a* and a second measurement unit display (km/h) 27*b* positioned immediately below the first measurement unit display 26*b*. The measurement unit displays 26*b* and 27*b* are printed on the board 21*a* as a part of the first speed display 26*a* and the second speed display 27*a*, respectively.

In the instrument panel 1 as described above, when the backlight 18 is lit to irradiate the entire dial 11 from the inside of the housing 2, the emitted light passes by and through the base non-transmissive layer 23 and the base semi-transmissive layer 22 respectively, which are printed on the back side of the dial 11. Thereby, the speed display parts 26 and 27 as well as the gear-range display part 28 are made to glow. In this event, in the first speed display part 26 and the gear-range display part 28, the characters and the scales are seen in black, and the background in the vicinity of the characters and the scales are seen in orange while glowing. The characters and the scale in the second speed display part 27 are seen in blue while glowing, and the background in the vicinity of the characters and the scale are seen in orange while glowing.

At the same time, the first speed display 26*a* (including the first measurement unit display 26*b*) and the gear range display 28*a* are seen on the near side (i.e. the side closer to driver) while the second speed display 27*a* (including the second measurement unit display 27*b*) is seen on the far side (i.e. the side farther away from the driver).

In this case, the relatively small analog display part 17 includes the two kinds of speed displays 26*a* and 27*a*, and the speed displays 26*a* and 27*a* are made to overlap with each other. Nevertheless, discriminating between the speed displays 26*a* and 27*a* can be done easily and reliably. This is made possible by providing the speed displays 26*a* and 27*a* with a difference in perspective, color, contrast to the background, and the like. Furthermore, the gear range display 28*a* is made visible in the same manner as the first speed display 26*a*, which serves as a primary speed display. Consequently, the high level of visibility for the two kinds of vehicle information needed during normal driving is achieved.

In addition, the first speed display 26*a* and the gear range display 28*a* are made in non-transmissive black color while the second speed display 27*a* is made in a blue color through which a small amount of light can pass. The discrimination between the first speed display 26*a* and the second speed display 27*a* can be made easier in this respect as well. Furthermore, the second speed display 27*a* positioned on the inner circumference side of the first speed display 26*a* is disposed on the far side of the dial 11. Accordingly, the second speed display 27*a* seems to be positioned still farther away than it really is.

As described above, the instrument panel 1 according to this embodiment includes: the board 21*a*, which is made of a transparent material; the first and second speed displays 26*a* and 27*a*, which are printed on the board 21*a* and display two kinds of information on vehicle speed; the gear range display 28*a*, which displays information (on gear shift) other than that on the vehicle speed; and the backlight 18, which emits light onto the board 21*a*. In the instrument panel 1, the second speed display 27*a* is disposed between the first speed display 26*a* and the gear range display 28*a* in the radial direction of the dial 11. In addition, the first speed display 26*a* and the gear range display 28*a* are printed on the front side of the board 21*a* while the second speed display 27*a* is printed on the back side thereof.

With this configuration, it is possible to ensure the high level of visibility of the information needed during normal driving. More specifically, in the instrument panel 1, the primary information (i.e. mph display) is set to be displayed on the first speed display 26*a*, and the first speed display 26*a* is printed on the front side of the board 21*a* together with the gear range display 28*a*. The secondary information, on the other hand, is set to be displayed on the second speed display 27*a*, and the display 27*a* is printed on the back side of the board 21*a*. This makes it possible to create a sense of depth, that is, a sense of perspective between the speed displays 26*a* and 27*a* in the thickness direction of the board 21*a*, especially when the backlight 18 is emitted. Thus, it can be made easier to discriminate between the speed displays 26*a* and 27*a*.

Moreover, in the instrument panel 1, the displays 26*a*, 27*a* and 28*a* are disposed in a concentric fashion as well as on respective, approximately circular arcs. The first speed display 26*a*, the second speed display 27*a* and the gear range display 28*a* are disposed in this order from the outer side to the inner side in the radial direction of the circular arcs. Accordingly, the second speed display 27*a*, which is sandwiched between the first speed display 26*a* and the gear range display 28, is disposed on the back side of the board 21*a*. In addition, the radius of the second speed display 27*a* is set smaller than that of the first speed display 26*a*. Accordingly, it is possible to provide a further perspective between the first and second speed displays 26*a* and 27*a*.

It should be noted that the present invention is not limited to the above-mentioned embodiment. The invention may be employed in an instrument panel that sets a km/h display as the primary display and a mph display as the secondary display. Furthermore, the third printed part for display of information other than that on vehicle speed may be for display of various indicators, the current gear position and the like in addition to display of gear range.

It should also be noted that the configuration according to the above-mentioned embodiment is an example of the present invention. The invention can also be employed in other kinds of vehicles than a motorcycle, and various modifications may be made therein without departing from the spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An instrumental device for a vehicle comprising:
a board made of a transparent material;
a first and second printed part provided on the board, said first printed part and said second printed part displaying, respectively, two kinds of information relative to vehicle speed;
a third printed part provided on the board, said third printed part displaying information other than the vehicle speed; and
a backlight for emitting light onto the board;
wherein the second printed part is disposed between the first and third printed parts, and the first and third printed parts are printed on a front side of the board while the second printed part is printed on a back side of the board, the back side of the board facing toward the backlight, the front side of the board facing away from the backlight, and
wherein each of the first and third printed parts on the front side of the board is a non-transmissive layer, and wherein on the back side of the board a base semi-transmissive layer is printed.

2. The instrumental device according to claim 1, wherein the third printed part displays information on gear shift.

3. The instrumental device according to claim 2, wherein the first, second and third printed parts are disposed in a concentric fashion as well as on respective, approximately circular arcs, and the first printed part, the second printed part and the third printed part are arranged in this order from an outer side to an inner side in a radial direction of the circular arcs.

4. The instrumental device according to claim 1, wherein the first, second and third printed parts are disposed in a concentric fashion as well as on respective, approximately circular arcs, and the first printed part, the second printed part and the third printed part are arranged in this order from an outer side to an inner side in a radial direction of the circular arcs.

5. The instrumental device according to claim 1, wherein the instrumental device includes a housing forming a trapezoidal shape, and the first printed part and the second printed part form a speedometer disposed approximately in a central portion of the housing.

6. The instrumental device according to claim 5, further comprising at least one indicator lamp disposed within the housing for indicating an engine condition.

7. The instrumental device according to claim 5, further comprising at least one gear-position lamp disposed within the housing for indicating a gear position condition.

8. The instrumental device according to claim 1, wherein the board is made of a clear, transparent and transmissive glass epoxy.

9. The instrumental device according to claim 8, wherein the base semi-transmissive layer covers the entire second printed part.

10. The instrumental device according to claim 9, wherein a base non-transmissive layer is printed on and below the base semi-transmissive layer.

11. The instrumental device according to claim 1, wherein the second printed part is a semi-transmissive layer.

12. An instrument panel adapted to be used with a vehicle comprising:
a transparent board;
a first and second printed indicia provided on the board, said first printed indicia and said second printed indicia displaying, respectively, two kinds of information relative to vehicle speed;
a third printed indicia provided on the board, said third printed indicia displaying information other than the vehicle speed; and
a backlight for emitting light onto the board;
wherein the first and third printed indicia are printed on a front side of the board while the second printed indicia is printed on a back side of the board, the back side of the board facing toward the backlight, the front side of the board facing away from the backlight, and
wherein each of the first and third printed indicia on the front side of the board is a non-transmissive layer, and wherein on the back side of the board a base semi-transmissive layer is printed.

13. The instrument panel according to claim 12, wherein the third printed indicia displays information on gear shift.

14. The instrument panel according to claim 13, wherein the first, second and third printed indicia are disposed in a concentric fashion as well as on respective, approximately circular arcs, and the first printed indicia, the second printed indicia and the third printed indicia are arranged in this order from an outer side to an inner side in a radial direction of the circular arcs.

15. The instrument panel according to claim 12, wherein the first, second and third printed indicia are disposed in a concentric fashion as well as on respective, approximately circular arcs, and the first printed indicia, the second printed indicia and the third printed indicia are arranged in this order from an outer side to an inner side in a radial direction of the circular arcs.

16. The instrument panel according to claim 12, wherein the instrumental device includes a housing forming a trapezoidal shape, and the first printed indicia and the second indicia form a speedometer disposed approximately in a central portion of the housing.

17. The instrument panel according to claim 16, further comprising at least one indicator lamp disposed within the housing for indicating an engine condition.

18. The instrument panel according to claim 16, further comprising at least one gear-position lamp disposed within the housing for indicating a gear position condition.

19. The instrument panel according to claim 12, wherein the board is made of a clear, transparent and transmissive glass epoxy.

20. The instrumental device according to claim 12, wherein the base semi-transmissive layer covers the entire second printed part.

21. The instrumental device according to claim 20, wherein a base non-transmissive layer is printed on and below the base semi-transmissive layer.

22. The instrumental device according to claim 12, wherein the second printed indicia is a semi-transmissive layer.

* * * * *